(12) United States Patent
Collias et al.

(10) Patent No.: US 12,187,856 B2
(45) Date of Patent: *Jan. 7, 2025

(54) DEPOLYMERIZATION OF POLYMERS

(71) Applicants: The Regents of the University of Michigan, Ann Arbor, MI (US); The Procter & Gamble Company, Cincinnati, OH (US)

(72) Inventors: Dimitris Ioannis Collias, Cincinnati, OH (US); Paul Zimmerman, Ann Arbor, MI (US); Paul Takunda Chazovachii, Ann Arbor, MI (US); Michael Robo, Ann Arbor, MI (US); Anne McNeil, Ann Arbor, MI (US); John McDaniel, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/001,338

(22) Filed: Aug. 24, 2020

(65) Prior Publication Data

US 2021/0054161 A1 Feb. 25, 2021

Related U.S. Application Data

(60) Provisional application No. 62/890,880, filed on Aug. 23, 2019.

(51) Int. Cl.
*C08J 11/06* (2006.01)
*C09J 133/02* (2006.01)

(52) U.S. Cl.
CPC ............. *C08J 11/06* (2013.01); *C09J 133/02* (2013.01); *C08J 2333/02* (2013.01)

(58) Field of Classification Search
CPC . C08F 120/06; C08F 8/00; C08J 11/06; C08J 11/10; C08J 2300/16; C08J 2333/02; C08J 2333/06; C09J 133/02; Y02W 30/62
See application file for complete search history.

(56) References Cited

U.S. PATENT DOCUMENTS

| | | |
|---|---|---|
| 3,677,788 A | 7/1972 | Zirnite |
| 5,508,313 A | 4/1996 | Delgado |
| 6,095,996 A | 8/2000 | Steer et al. |
| 7,291,679 B2 | 11/2007 | Maehara et al. |
| 2003/0114621 A1 | 6/2003 | Kasahara et al. |
| 2005/0037144 A1 | 2/2005 | Cesiro et al. |
| 2005/0101208 A1 | 5/2005 | Heider et al. |
| 2010/0099781 A1* | 4/2010 | Tian .................. B01J 20/26 |
| | | 521/40.5 |
| 2010/0204068 A1 | 8/2010 | Kesavan et al. |
| 2010/0322996 A1 | 12/2010 | Wibaux et al. |
| 2010/0330860 A1 | 12/2010 | Puerkner et al. |
| 2012/0302445 A1 | 11/2012 | Rudolph et al. |
| 2014/0230322 A1 | 8/2014 | Zhang et al. |
| 2020/0149220 A1 | 5/2020 | Konishi et al. |
| 2021/0054248 A1 | 2/2021 | Collias et al. |
| 2023/0234028 A1 | 7/2023 | Collias et al. |

FOREIGN PATENT DOCUMENTS

| | | |
|---|---|---|
| CN | 101781535 A | 7/2010 |
| CN | 110237821 A | 9/2019 |
| EP | 0797644 A1 | 10/1997 |
| EP | 3238840 A1 | 11/2017 |
| JP | H09249711 * | 9/1997 |
| KR | 20200035191 A | 4/2020 |

OTHER PUBLICATIONS

Ebrahimi, "Influence of Ultrasonic Parameters on the Degradation of Acrylic acid/Acrylamide copolymers based superabsorbent Hydrogels cross-linked with NMBA", Iran Polymer J, vol. 21, No. 1, 2012, pp. 11-20 (Year: 2012).*
Ebrahimi et al, "The Study of Ultrasonic Degradation of Superabsorbent Hydrogels", Organic Chemistry International, vol. 2012, Article ID 343768, 2012, 5 pages, Hindawi Publishing Corporation (Year: 2012).*
Machine translation of JPH09249711, Sasaki et al, Sep. 1997 (Year: 1997).*
Non Final Office Action; U.S. Appl. No. 17/001,345 dated Dec. 5, 2022.
Notice of Allowance; U.S. Appl. No. 17/001,345 dated Feb. 1, 2023.
Notice of Allowance; U.S. Appl. No. 17/001,345 dated Mar. 8, 2023.
Chazovachii et al., "Using Adhesives to Capture Microplastics from Water", ACS Publications, Oct. 19, 2021, pp. 1698-1704.
Francesca et al., The contribution of washing processes of synthetic clothes to microplastic pollution, Scientific Reports, Retrieved from Internet:https://www.nature.com/articles/s41598-019-43023-x, Apr. 29, 2019, 11 Pages.

* cited by examiner

*Primary Examiner* — Frances Tischler
(74) *Attorney, Agent, or Firm* — Daniel S. Albrecht; James E. Oehlenschlager

(57) ABSTRACT

Provided herein is technology relating to depolymerization of polymers and particularly, but not exclusively, to methods and systems for de-crosslinking polyacrylate salt-based polymers and other polymers and compositions made from de-crosslinking polyacrylate salt-based polymers and other polymers.

11 Claims, 12 Drawing Sheets
(7 of 12 Drawing Sheet(s) Filed in Color)

DEPOLYMERIZATION OF POLYMERS

This application claims priority to U.S. provisional patent application Ser. No. 62/890,880, filed Aug. 23, 2019, which is incorporated herein by reference in its entirety.

FIELD

Provided herein is technology relating to depolymerization of polymers and particularly, but not exclusively, to methods and systems for de-crosslinking and/or degrading polyacrylate salt-based polymers and other polymers and compositions made from de-crosslinking polyacrylate salt-based polymers and other polymers.

BACKGROUND

Recycling of absorbent hygiene products (AHPs) (e.g., baby diapers, feminine protection pads, and adult incontinence pads) is important for achieving sustainability goals of many consumer companies. For example, some recycling goals include using 100% recycled materials and depositing zero consumer and manufacturing waste in a landfill. In addition to these goals, successful recycling benefits the environment, stimulates the economy, improves human health and water quality, and generates energy needed by consumers in developing regions of the world.

A major component in AHPs is typically a superabsorbent polymer (SAP); other components include adhesives, cellulose fibers, polyethylene, polypropylene, and polyester. SAP is a water-absorbing, water-swellable, and water-insoluble powdered solid that is a crosslinked and partially neutralized homopolymer of glacial acrylic acid. SAP has an exceptionally high ability to absorb aqueous liquids (e.g., contaminated water). Recycling of AHPs involves cleaning AHPs and separating the various components into recycled material streams that find use in, e.g., agricultural or horticultural water-retaining agents and industrial waterproofing agents. Further, recycled SAP can be converted to essentially non-crosslinked and/or slightly branched or linear poly(acrylic acid) (PAA). The PAA can be used as-is in various applications, e.g., water treatment or corrosion inhibition. The PAA can be esterified and used in, e.g., adhesives, coatings, etc. The PAA can be re-polymerized and/or re-crosslinked to produce to SAP, which finds use in various application or can be blended with virgin SAP. Accordingly, some of these uses recycle SAP into other products by replacing virgin acrylic acid-based compounds with compounds derived from recycled SAP and some of these uses contribute to the circular economy of SAP, e.g., recycling SAP back to SAP.

Recycled SAP can be either post-consumer recycled (PCR) SAP or post-industrial (PIR) SAP. Non-limiting examples of processes that produce recycled SAP material streams from recycled AHPs are disclosed in, e.g., U.S. Pat. Nos. 9,095,853 and 9,156,034, each of which is incorporated herein by reference. Most SAPs are based on poly(acrylic acid) and are crosslinked network materials. Non-limiting examples of procedures used to produce SAPs from acrylic acid and crosslinkers are disclosed in, e.g., U.S. Pat. Nos. 8,383,746 and 9,822,203, each of which is incorporated herein by reference.

Some technologies have been developed to degrade and/or de-polymerize linear polymers, including ultrasound, ultraviolet radiation, and mechanical disruption (e.g., extensional and/or elongational forces (see, e.g., Caruso et al. (2009) Chem. Rev. 109: 5755-98)). These extant technologies are directed to de-polymerize linear polymers by producing scission at the mid-point of the polymer chain. Accordingly, higher molecular weight chains are degraded at a higher rate than the lower molecular weight chains and there is a minimum molecular weight below which degradation or depolymerization does not occur. Nevertheless, these technologies are not sufficiently developed to degrade and/or depolymerize the crosslinked network materials found in SAPs.

Accordingly, there is a need for new technologies for recycling AHPs and their major component, SAP, by depolymerizing recycled SAP into linear poly(acrylic acid) (PAA), e.g., using a technology that produces degradation products on a short time scale and using mild conditions.

SUMMARY

Provided herein is technology relating to depolymerization of polymers and particularly, but not exclusively, to methods and systems for de-crosslinking and/or degrading polyacrylate-based polymers (e.g., SAP) and other polymers and compositions (e.g., PAA) made from de-crosslinking polyacrylate-based polymers and other polymers. In some embodiments, the technology provides a method of producing PAA from SAP. In some embodiments, the technology has a relatively low energy requirement per unit mass of SAP, e.g., such that the energy input for converting SAP to PAA is less than that used to make fossil-derived acrylic acid (petro-AA) from propylene, which is approximately 50 MJ/kg (50 kJ/g) AA. The PAA produced from recycled SAP finds use in some embodiments for incorporation into virgin SAP (thus increasing its recycled content and supporting the circular economy of SAP) and/or derivatized into materials for other applications, e.g., adhesives, coatings, water treatment products, fabric care products, etc.

Accordingly, provided herein are embodiments of methods for producing polyacrylic acid (PAA) from a superabsorbent polymer (SAP). For example, in some embodiments, methods comprise sonicating an aqueous SAP hydrogel to produce the PAA. In some embodiments, methods further comprise adding base to the aqueous SAP hydrogel. In some embodiments, methods comprise adding NaOH to the aqueous SAP hydrogel. In some embodiments, methods comprise adding NaCl (e.g., 0.01 to 0.5 M NaCl (e.g., 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 M NaCl)) to the aqueous SAP hydrogel (e.g., to reduce the viscosity of the solution). In some embodiments, the sonicating provides an ultrasonic frequency (e.g., greater than approximately 18 kHz). In some embodiments, the sonicating provides a frequency of 20 kHz. In some embodiments, the method recovers at least 80% (e.g., 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, 85.0, 85.1, 85.2, 85.3, 85.4, 85.5, 85.6, 85.7, 85.8, 85.9, 86.0, 86.1, 86.2, 86.3, 86.4, 86.5, 86.6, 86.7, 86.8, 86.9, 87.0, 87.1, 87.2, 87.3, 87.4, 87.5, 87.6, 87.7, 87.8, 87.9, 88.0, 88.1, 88.2, 88.3, 88.4, 88.5, 88.6, 88.7, 88.8, 88.9, 89.0, 89.1, 89.2, 89.3, 89.4, 89.5, 89.6, 89.7, 89.8, 89.9, or 90.0%) of the SAP as PAA. In some embodiments, the aqueous SAP hydrogel comprises at least 0.50%, 1.0%, 2.5%, or 5.0% weight per volume SAP. In some embodiments, the PAA has a $M_w$ of approximately 50 to 3000 kg/mol (e.g., approximately 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or 3000 kg/mol). In some embodiments, the PAA has a dispersity of approximately 1.0 to 10.0 (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0). In some embodiments, the maximum specific energy ($w_{max}$) of the sonicating is less than or equal to 50 MJ/kg SAP (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 MJ/kg). In some embodiments, the sonicating is performed for at least 1 to 25, 15 to 25, and/or 20 to 25 minutes. In some embodiments, the sonicating is performed for approximately 15 to 20 minutes (e.g., 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0 minutes). In some embodiments, the sonicating is performed for less than approximately 15 to 20 minutes (e.g., less than approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0 minutes). In some embodiments, methods further comprise obtaining the SAP from a post-consumer source or a post-industrial source.

In some embodiments, the technology relates to a system for producing PAA. For example, in some embodiments, a system comprises an aqueous SAP hydrogel and a sonicator. In some embodiments, the system further comprises NaOH. In some embodiments, the system further comprises NaCl (e.g., 0.01 to 0.5 M NaCl (e.g., 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 M NaCl)), e.g., to reduce the viscosity of the solution. In some embodiments, the aqueous SAP hydrogel further comprises NaOH. In some embodiments, the sonicator is configured to provide an ultrasonic frequency. In some embodiments, the sonicator is configured to provide a frequency of 20 kHz. In some embodiments, the aqueous SAP hydrogel comprises at least 0.50%, 1.0%, 2.5%, or 5.0% weight per volume SAP. In some embodiments, the PAA has a $M_w$ of approximately 50 to 3000 kg/mol (e.g., approximately 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or 3000 kg/mol). In some embodiments, the PAA has a dispersity of approximately 1.0 to 10.0 (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0). In some embodiments, the maximum specific energy ($w_{max}$) of the sonicating is less than or equal to 50 MJ/kg SAP (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 MJ/kg SAP). In some embodiments, the SAP is from a post-consumer source or a post-industrial source.

In some embodiments, the technology provides a PAA produced according to a method comprising sonicating an aqueous SAP hydrogel to produce the PAA. In some embodiments, the method further comprises adding NaOH to the aqueous SAP hydrogel. In some embodiments, the method further comprises adding NaCl (e.g., 0.01 to 0.5 M NaCl (e.g., 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, or 0.50 M NaCl)) to the aqueous SAP hydrogel (e.g., to reduce the viscosity of the solution). In some embodiments, the sonicating provides an ultrasonic frequency. In some embodiments, the sonicating provides a frequency of 20 kHz. In some embodiments, the method recovers at least 80% (e.g., 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, 85.0, 85.1, 85.2, 85.3, 85.4, 85.5, 85.6, 85.7, 85.8, 85.9, 86.0, 86.1, 86.2, 86.3, 86.4, 86.5, 86.6, 86.7, 86.8, 86.9, 87.0, 87.1, 87.2, 87.3, 87.4, 87.5, 87.6, 87.7, 87.8, 87.9, 88.0, 88.1, 88.2, 88.3, 88.4, 88.5, 88.6, 88.7, 88.8, 88.9, 89.0, 89.1, 89.2, 89.3, 89.4, 89.5, 89.6, 89.7, 89.8, 89.9, or 90.0%) of the SAP as PAA. In some embodiments, the aqueous SAP hydrogel comprises at least 0.50%, 1.0%, 2.5%, or 5.0% weight per volume SAP. In some embodiments, the PAA has a $M_w$ of approximately 50 to 3000 kg/mol (e.g., approximately 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or 3000 kg/mol). In some embodiments, the PAA has a dispersity of approximately 1.0 to 10.0 (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0). In some embodiments, the maximum specific energy ($w_{max}$) of the sonicating is less than or equal to 50 MJ/kg SAP (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 MJ/kg SAP).

In some embodiments, the sonicating is performed for at least 1 to 25, 15 to 25, and/or 20 to 25 minutes. In some embodiments, the sonicating is performed for approximately 15 to 20 minutes (e.g., 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0 minutes). In some embodiments, the sonicating is performed for less than approximately 15 to 20 minutes (e.g., less than approximately 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, or 20.0 minutes). In some embodiments, the method further comprises obtaining the SAP from a post-consumer source or a post-industrial source.

In some embodiments, the technology provides use of a method comprising sonicating SAP to produce PAA.

In some embodiments, the technology provides methods for recycling SAP. For example, in some embodiments, methods comprise obtaining SAP from a post-consumer and/or post-industrial source; and sonicating the SAP to produce PAA. In some embodiments, methods further comprise adding NaOH to the SAP. In some embodiments, methods further comprise producing SAP from the PAA. In some embodiments, methods further comprise producing an adhesive from the PAA. In some embodiments, the post-consumer source comprises a personal disposable hygiene product.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings. The patent or application file contains at least one drawing executed in color. Copies of this patent or patent application publication with color drawings will be provided by the Office upon request and payment of the necessary fee.

Figure 1:
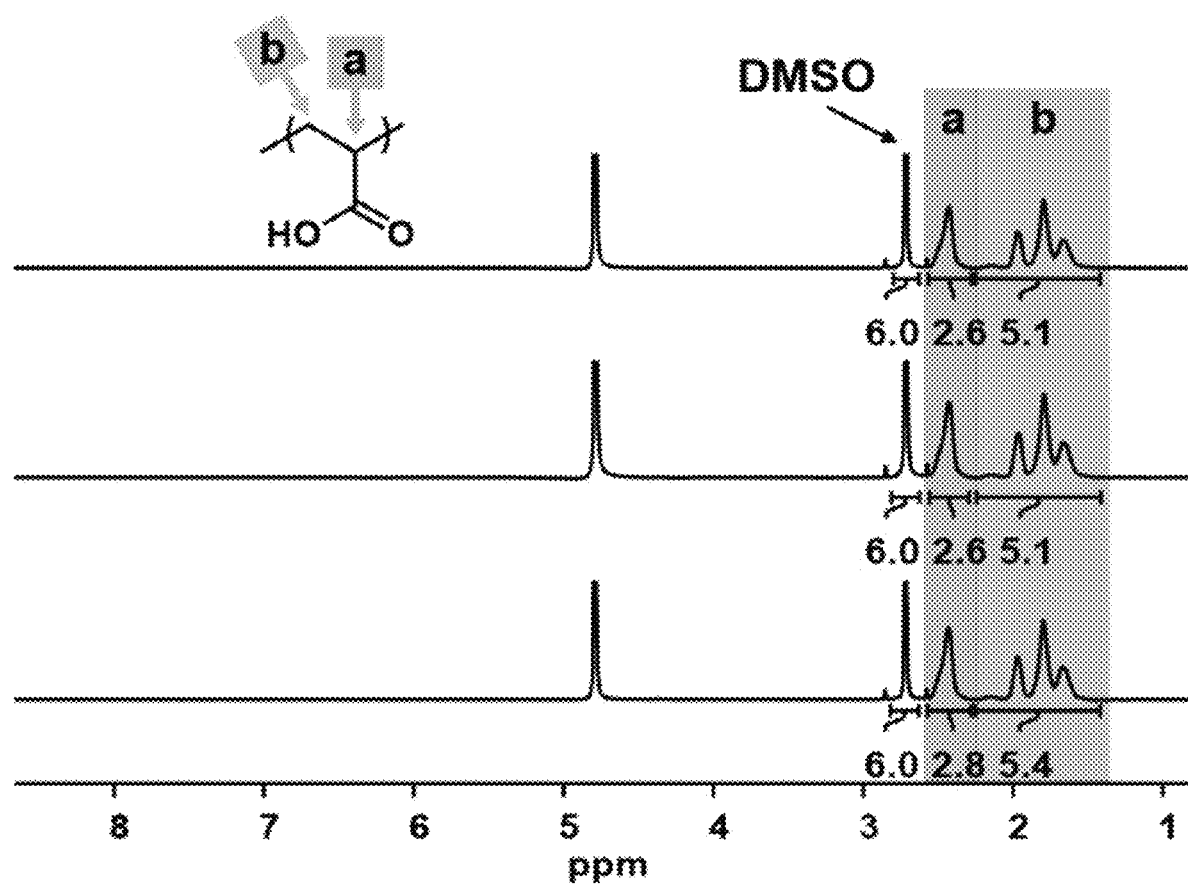
FIG. 1 shows $^1$H-NMR spectra for three trials of sonicated $PAA_{SPP}$ spiked with known amounts of DMSO (relaxation delay=25 s, 500 MHz, $CDCl_3$). The peak labeled "b" corresponds to the chemical shift of the PAA repeat unit and was used to quantify PAA relative to the known amount of DMSO standard corresponding to the peak labeled "a".
Figure 2:
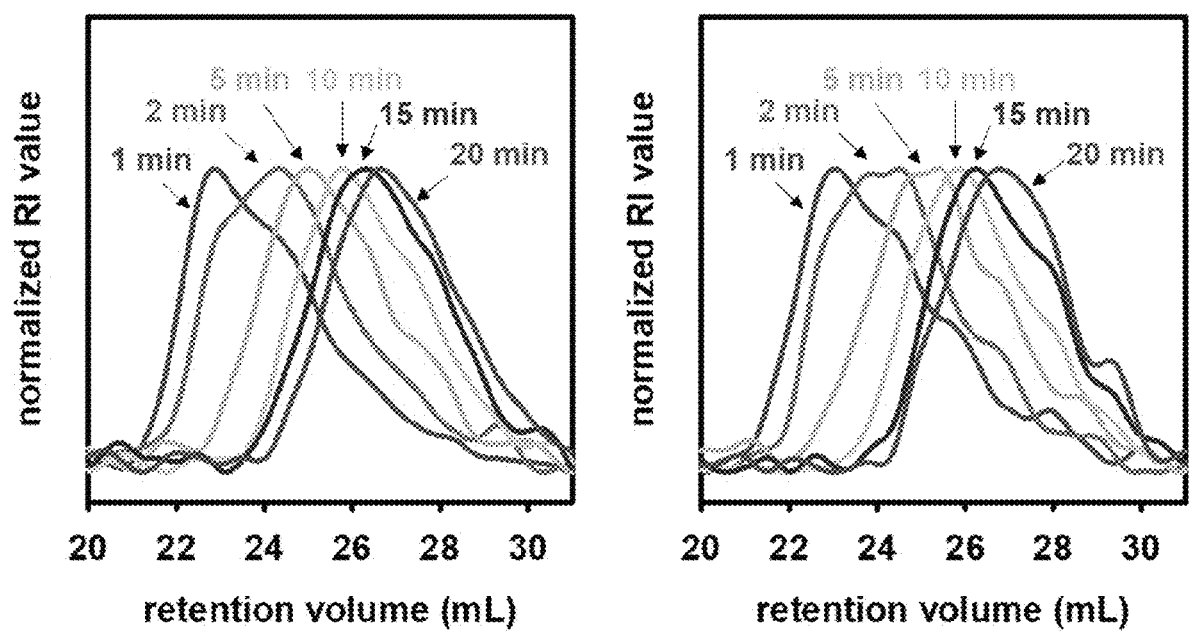
FIG. 2 shows SEC traces for two trials of sonicated $PAA_{SPP}$ at 0.50% w/v. Labels indicate elution peaks for samples sonicated for 1, 2, 5, 10, 15, and 20 minutes.
Figure 3:
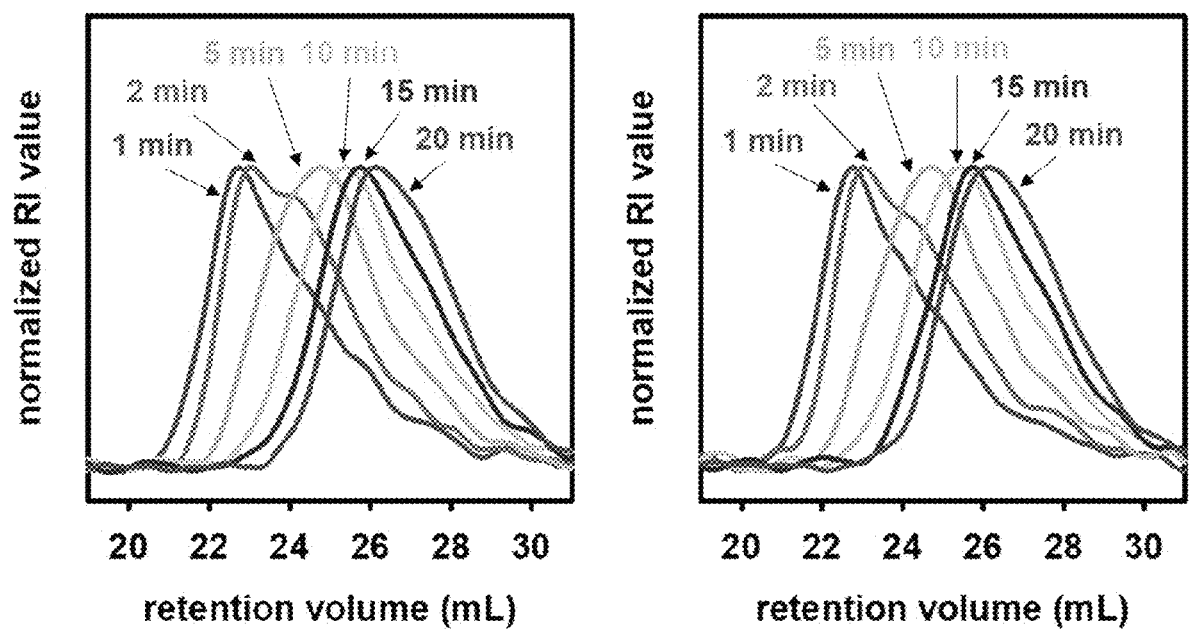
FIG. 3 shows SEC traces for two trials of sonicated $PAA_{SPP}$ at 1.0% w/v. Labels indicate elution peaks for samples sonicated for 1, 2, 5, 10, 15, and 20 minutes.
Figure 4:
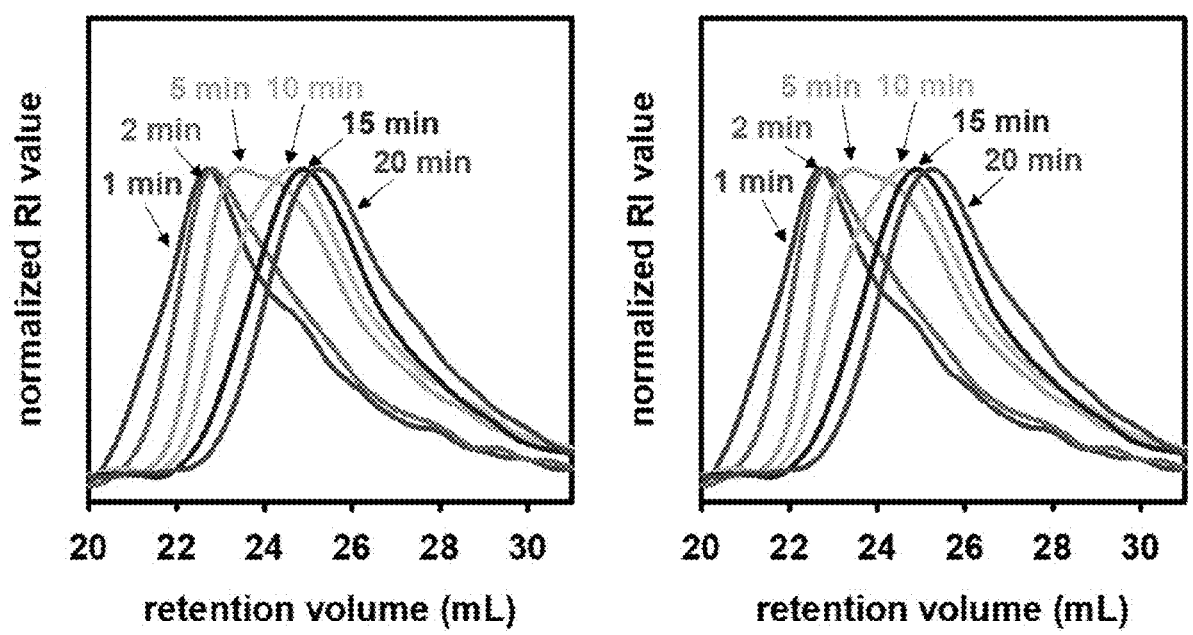
FIG. 4 shows SEC traces for two trials of sonicated $PAA_{SPP}$ at 2.5% w/v. Labels indicate elution peaks for samples sonicated for 1, 2, 5, 10, 15, and 20 minutes.
Figure 5:
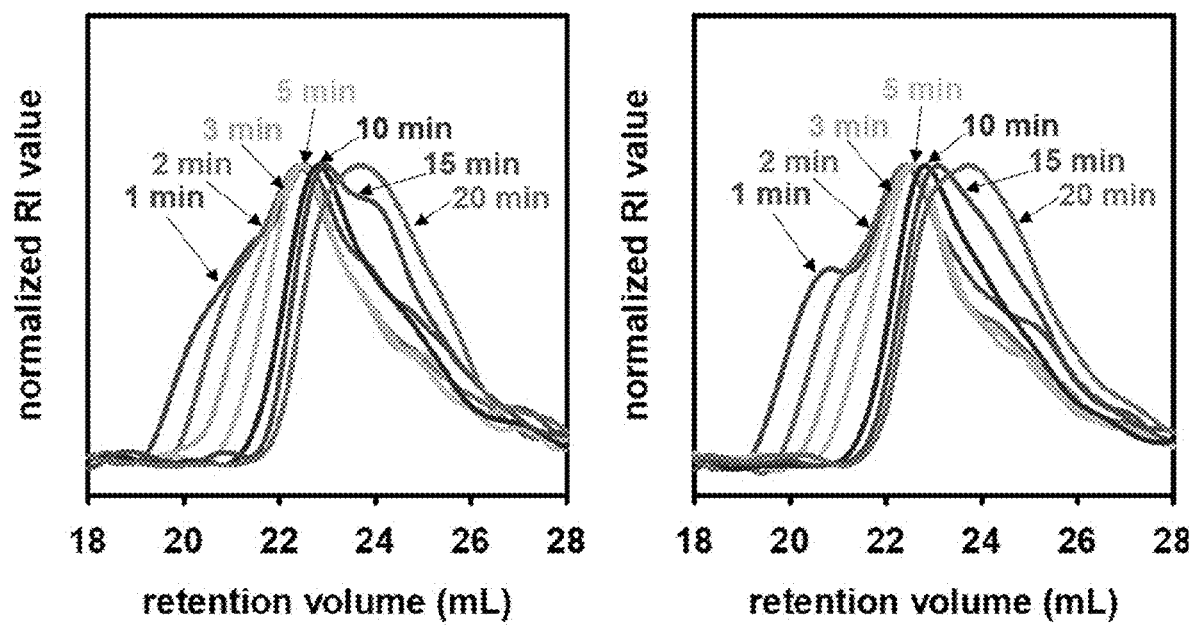
FIG. 5 shows SEC traces for two trials of sonicated $PAA_{SPP}$ at 5.0% w/v. Labels indicate elution peaks for samples sonicated for 1, 2, 5, 10, 15, and 20 minutes.
Figure 6:
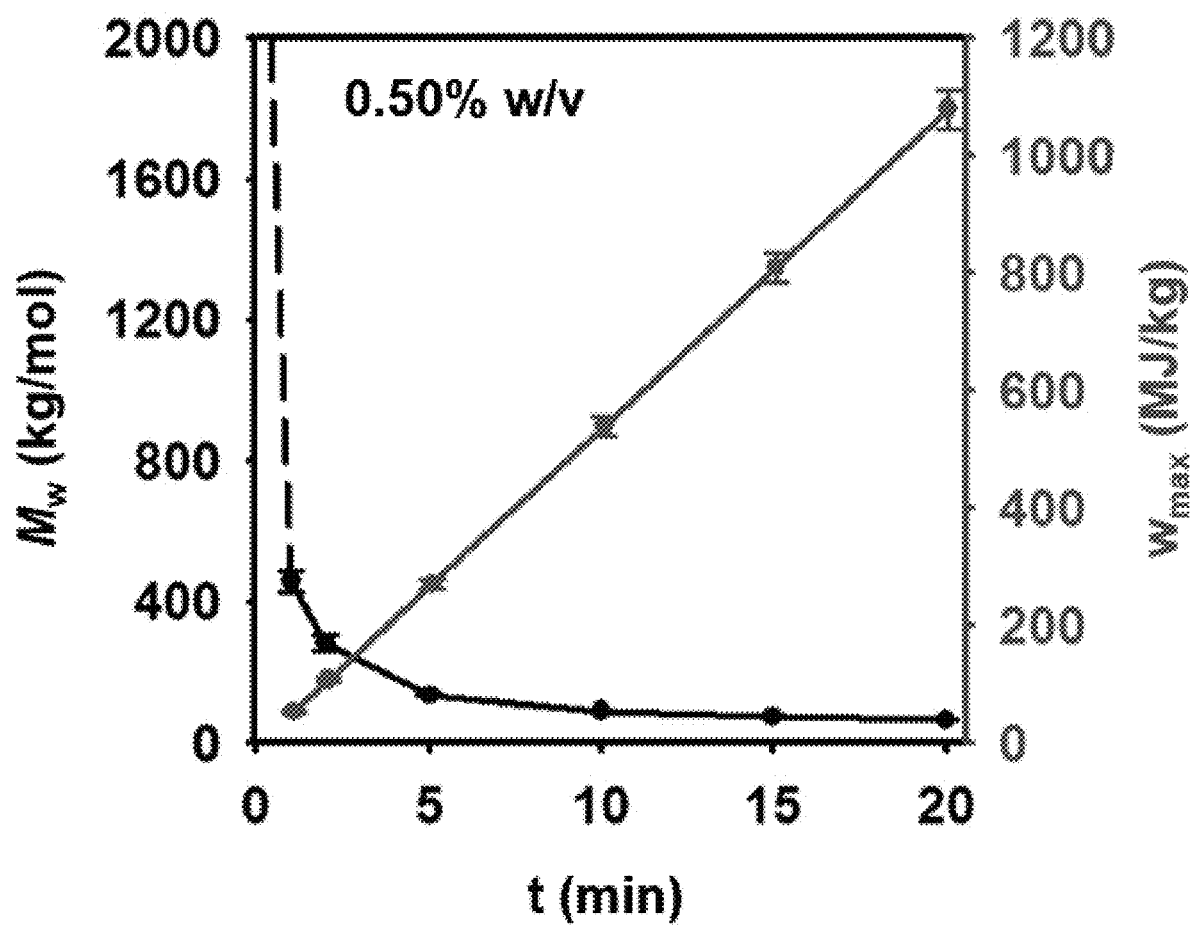
FIG. 6 shows is a plot of $M_w$ and maximum specific energy ($w_{max}$) versus time for the sonication of $PAA_{SPP}$ at 0.50% w/v.
Figure 7:
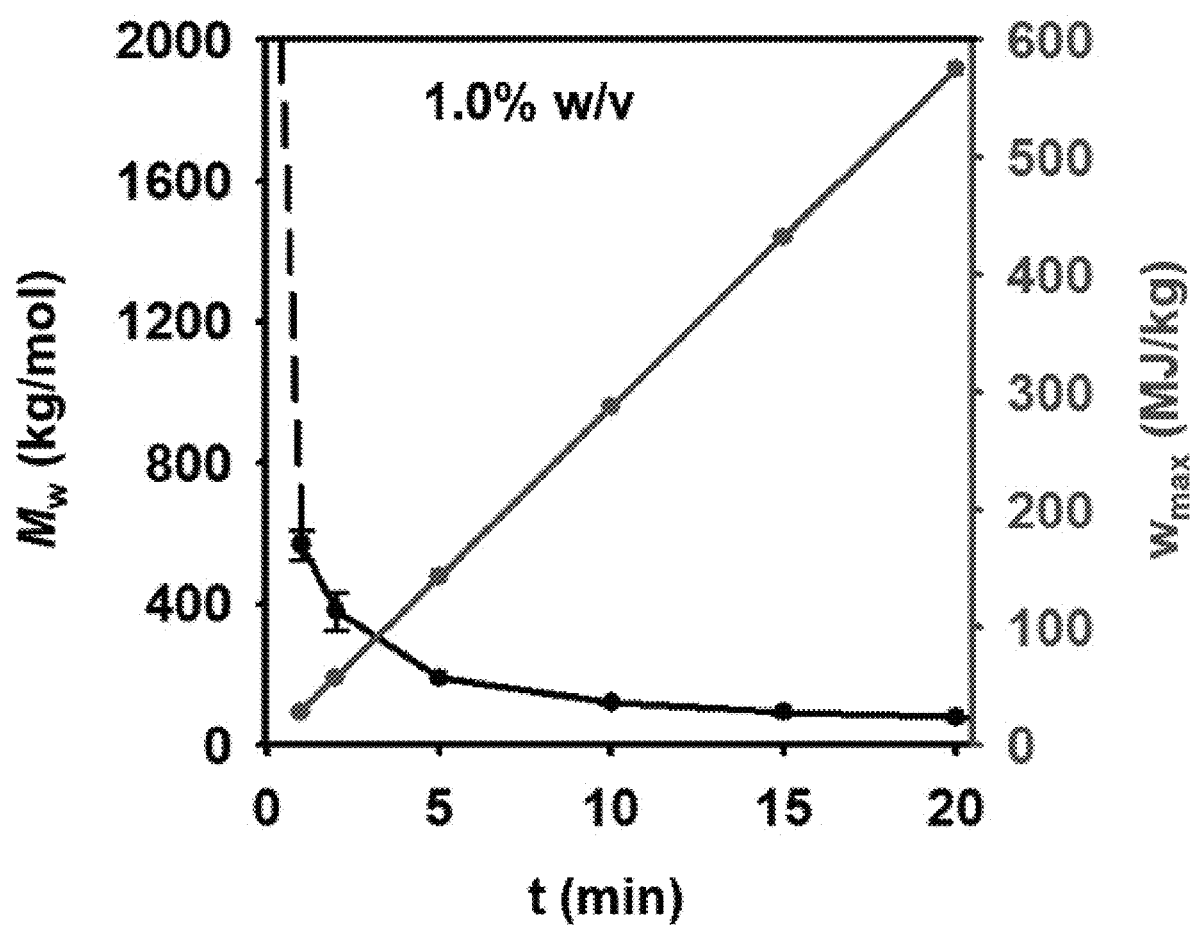
FIG. 7 shows is a plot of $M_w$ and maximum specific energy ($w_{max}$) versus time for the sonication of $PAA_{SPP}$ at 1.0% w/v.
Figure 8:
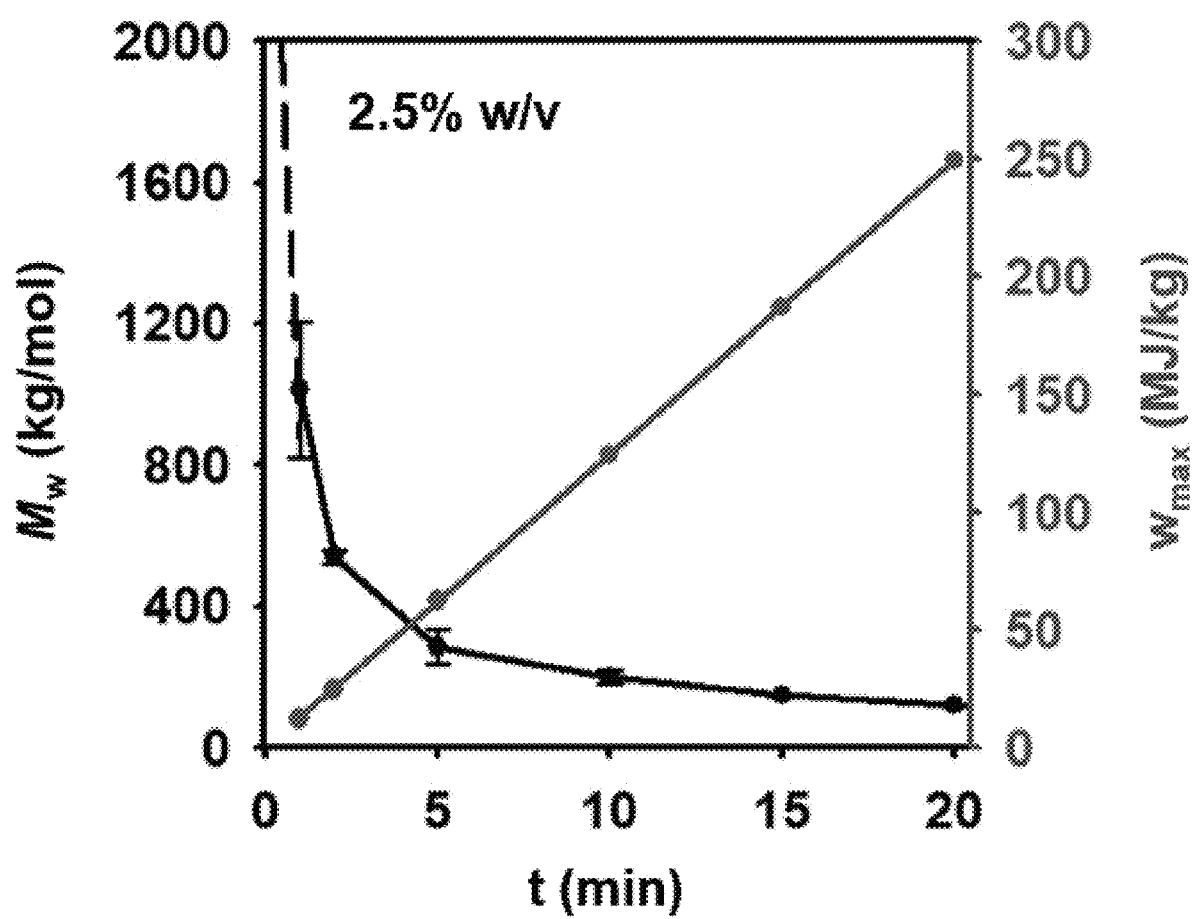
FIG. 8 shows is a plot of $M_w$ and maximum specific energy ($w_{max}$) versus time for the sonication of $PAA_{SPP}$ at 2.5% w/v.
Figure 9:
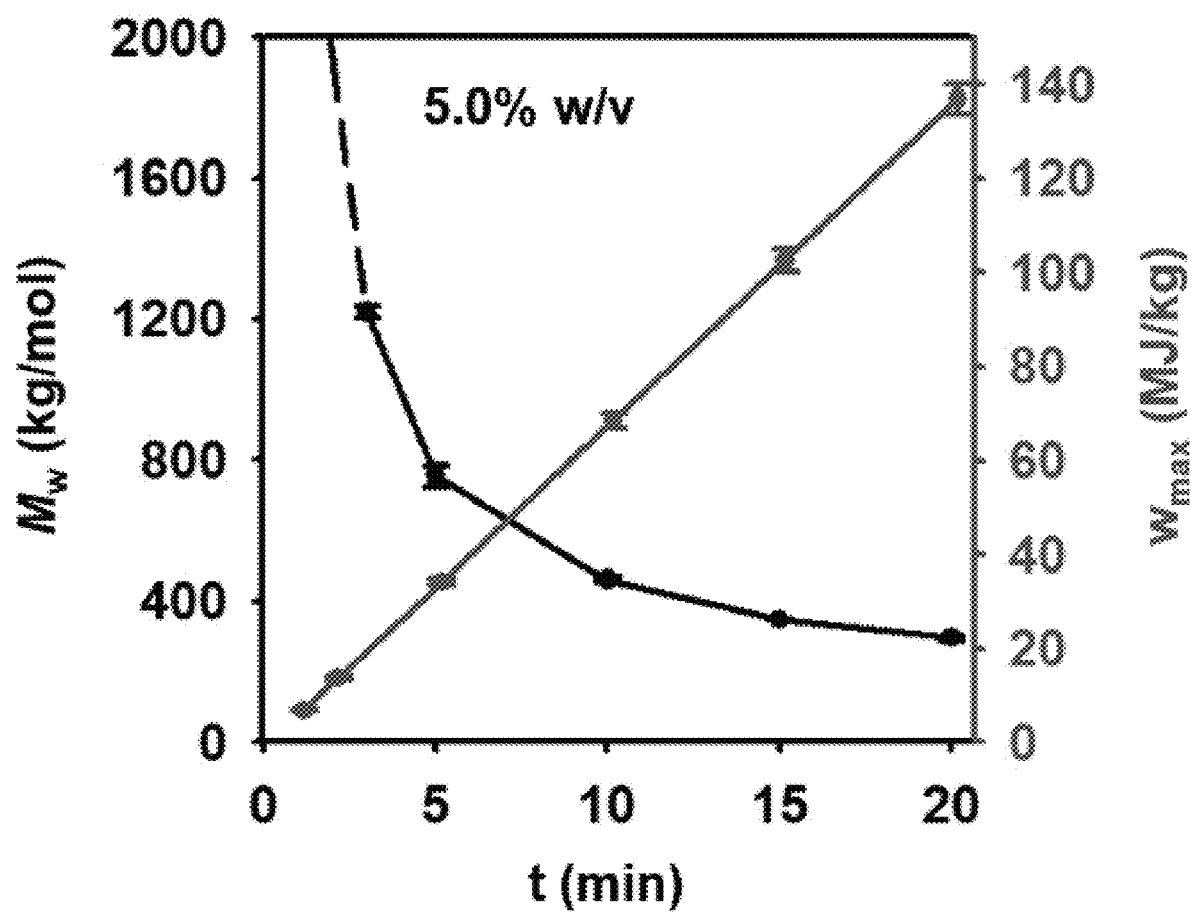
FIG. 9 shows is a plot of $M_w$ and maximum specific energy ($w_{max}$) versus time for the sonication of $PAA_{SPP}$ at 5.0% w/v.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to depolymerization of polymers and particularly, but not exclusively, to methods and systems for de-crosslinking and/or degrading polyacrylate-based polymers and other polymers and compositions made from de-crosslinking polyacrylate-based polymers and other polymers. In some embodiments, the technology provides a practical method to de-crosslink sodium polyacrylate-based superabsorbent polymers (SAP). SAP is an insoluble, crosslinked network polymer with an absorbency capacity of at least approximately 10,000% by weight (e.g., for deionized water). In some embodiments, the technology finds use in providing materials for synthesizing pressure sensitive adhesives (PSAs). Both SAP and PSA are used in common consumer products; accordingly, the present technology is related in some embodiments to recycling discarded SAP for use in a new material, PSA. The technology relates to degrading (e.g., de-crosslinking and/or depolymerizing) SAP, e.g., using ultrasound (e.g., as provided by a sonicator) and/or treatment with base (e.g., NaOH).

During the development of embodiments of the technology described herein, experiments were conducted in which SAP was partially de-crosslinked with approximately 0.3 M NaOH in approximately 24 hours or with approximately 3 M NaOH in approximately 5 hours. Accordingly, in some embodiments, the technology provides a method comprising adding aqueous base (e.g., NaOH (e.g., approximately 0.3 to 3 M NaOH (e.g., approximately 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5 M NaOH))) to SAP (e.g., approximately 5% w/v) and stirring (e.g., at approximately 80° C. (e.g., 75.0, 75.1, 75.2, 75.3, 75.4, 75.5, 75.6, 75.7, 75.8, 75.9, 76.0, 76.1, 76.2, 76.3, 76.4, 76.5, 76.6, 76.7, 76.8, 76.9, 77.0, 77.1, 77.2, 77.3, 77.4, 77.5, 77.6, 77.7, 77.8, 77.9, 78.0, 78.1, 78.2, 78.3, 78.4, 78.5, 78.6, 78.7, 78.8, 78.9, 79.0, 79.1, 79.2, 79.3, 79.4, 79.5, 79.6, 79.7, 79.8, 79.9, 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, or 85.0° C.) for approximately 0.5 to 24 hours (e.g., 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, or 24.0 hours)) to provide partially de-crosslinked SAP, e.g., comprising at least 60% (e.g., at least 60, 65, 70, 75, 80, or 85%) soluble fragments (e.g., as confirmed by mass recovery). In some embodiments, the technology provides a method comprising adding aqueous base (e.g., NaOH (e.g., approximately 0.1 to 5.0 M NaOH (e.g., approximately 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 M NaOH))) to SAP (e.g., approximately 2-10% w/v (e.g., 2.0, 2.5, 3.0, 3.5, 4.0, 4.5, 5.0, 5.5, 6.0, 6.5, 7.0, 7.5, 8.0, 8.5, 9.0, 9.5, or 10.0% w/v)) and stirring (e.g., at approximately 70-95° C. (e.g., 70.0, 70.5, 71.0, 71.5, 72.0, 72.5, 73.0, 73.5, 74.0, 74.5, 75.0, 75.5, 76.0, 76.5, 77.0, 77.5, 78.0, 78.5, 79.0, 79.5, 80.0, 80.5, 81.0, 81.5, 82.0, 82.5, 83.0, 83.5, 84.0, 84.5, 85.0, 85.5, 86.0, 86.5, 87.0, 87.5, 88.0, 88.5, 89.0, 89.5, 90.0, 90.5, 91.0, 91.5, 92.0, 92.5, 93.0, 93.5, 94.0, 94.5, or 95.0° C.)) for at least 5 minutes (e.g., 5 to 7000 minutes)) to provide partially de-crosslinked SAP, e.g., comprising at least 60% (e.g., at least 60, 65, 70, 75, 80, or 85%) soluble fragments (e.g., as confirmed by mass recovery).

Next, in some embodiments, methods comprise sonicating the partially de-crosslinked SAP hydrogel. In some embodiments, 50 mL of 5% w/v partially de-crosslinked SAP (e.g., produced by treating SAP with aqueous base) is sonicated in a 50-mL jacketed beaker at 100% amp, 220 W for 1-2 minutes using a Sonics & Materials, Inc. ultrasound unit equipped with a 13-mm replaceable tip probe. In some embodiments, the methods produce a degraded polymer with at least 80% to 90% recovery.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "ultrasonic" refers to sound having a frequency above the limit of human hearing (approximately 18,000 Hertz).

As used herein, the term "shear" refers to a strain produced by pressure in the structure of a substance when its layers are laterally shifted in relation to each other.

As used herein, the term "turbulence" refers to the irregular and disordered flow of fluids.

As used herein, the term "cavitation" refers to the formation of bubbles in a liquid due to the hydrodynamics of the liquid and the subsequent collapsing of those bubbles.

As used herein, the term "SAP" refers to crosslinked poly(acrylic acid)-based superabsorbent polymer. Exemplary SAPs are disclosed in U.S. Pat. Nos. 8,383,746 and 9,822,203, each of which is incorporated herein by reference. SAPs absorb aqueous solutions to form a gel. Absorption is generally driven by osmotic pressure.

As used herein, the term "poly(acrylic acid)" or "PAA" or "polymer of acrylic acid" refers to water soluble poly(acrylic acid) molecules with acrylic acid as the monomeric unit. The PAA molecules may be crosslinked, branched, and/or linear. In some embodiments, the degree of polymerization is 2 or higher. As used herein, the terms "poly(acrylic acid)" or "PAA" or "polymer of acrylic acid" refer both to a polymer of acrylic acid and an oligomer of acrylic acid.

As used herein, the term "solution" refers to a homogeneous mixture comprising two or more substances, e.g., a solute dissolved in a solvent. The term "solution" is also used to refer to colloids, gels, and suspensions, e.g., colloidal gels comprising hydrophilic polymers in a dispersion medium (e.g., water). In some embodiments, aqueous SAP hydrogels are treated (e.g., with base and/or sonication) to produce aqueous solutions of PAA. Accordingly, in some embodiments the technology relates to compositions that are intermediate compositions formed from the degradation of hydrogels (e.g., SAP hydrogels) to form solutions (e.g., PAA solutions) and that have some characteristics of solutions and some characteristics of hydrogels. Accordingly, the term "solution" is used to refer to the hydrogels, the solutions, and the intermediate compositions having some characteristics of both hydrogels and solutions.

As used herein, the term "degradation" refers to the conversion of SAP into PAA via the actions of depolymerization, de-crosslinking, molecular backbone breaking, or any combination thereof. As used herein, the terms degradation, recycling, and conversion are used interchangeably to refer to the transformation of SAP to PAA. Further, in some embodiments degradation essentially preserves the carboxylic groups of the SAP and thus the product PAA comprises those carboxylic groups.

As used herein, the terms "viscosity ratio" or "viscosity reduction ratio" refer to a ratio of viscosities, e.g., the viscosity of a product relative to the viscosity of an input material used to produce said product. In some embodiments, the negative of the logarithm of the viscosity ratio indicates the extent of the SAP degradation to PAA in orders of magnitude. Typically, viscosity and molecular weight are correlated, e.g., such that a lower viscosity PAA solution comprises a lower molecular weight PAA.

As used herein, the term "degree of neutralization" or "DN" refers to the molar percentage of the acid groups in SAP or PAA that are neutralized by the reaction with a base (typically, sodium hydroxide). A typical method to measure the DN of an SAP is to measure the Na content using the Inductively Coupled Plasma (ICP) analytical technique, as it is well known to those skilled in the art.

As used herein, $M_n$ is the number average molecular weight (e.g., in g/mol (or Da) or kg/mol), $M_w$ is the weight average molecular weight (e.g., in g/mol (or Da) or kg/mol), and $M_z$ is the z-average molecular weight (e.g., in g/mol (or Da) or kg/mol). The terms dispersity (Đ) and polydispersity index (PDI) are used interchangeably and are defined as $M_w/M_n$.

DESCRIPTION

Although the disclosure herein refers to certain illustrated embodiments, it is to be understood that these embodiments are presented by way of example and not by way of limitation.

SAP

The technology provided herein relates to degradation (e.g., decrosslinking and/or depolymerization) of polymers. In some embodiments, the technology provided herein relates to degradation (e.g., decrosslinking and/or depolymerization) of SAP (e.g., a SAP comprising poly-acrylic acid sodium salt (sodium polyacrylate)). In some embodiments, the technology provided herein relates to degradation (e.g., decrosslinking and/or depolymerization) of SAP (e.g., an SAP comprising poly-acrylic acid sodium salt (sodium polyacrylate)) to produce PAA. Exemplary types and/or sources of SAP include, e.g., virgin SAP, post-consumer recycled SAP (PCR SAP), post-industrial recycled SAP (PIR SAP), or a combination of those materials. In some embodiments, the SAP is obtained from one or more personal disposable hygiene products, (e.g., baby diapers, adult diapers, sanitary napkins, etc.) The typical properties used to characterize SAP are mechanical properties, swelling capacity, saline flow conductivity (SFC), absorption against pressure (AAP), residual monomer, extractables, and cylinder retention capacity (CRC). SAP may also include other co-monomers, e.g., itaconic acid, acrylamide, etc., or other materials e.g., starch, cellulosic fibers, clays, etc.

SAP is typically prepared using a homogeneous solution polymerization process or by multiphase polymerization techniques, such as inverse emulsion or suspension polymerization. SAP is generally polymerized in the presence of a relatively small amount of di-functional and/or poly-functional monomers, such as N,N'-methylene bisacrylamide, trimethylolpropane triacrylate, ethylene glycol di(meth)acrylate, triallylamine, etc. The di-functional or poly-functional monomer compounds crosslink the acrylate polymer chains, thereby rendering the SAP water-insoluble, yet water-swellable. Furthermore, SAP can be surface-crosslinked after polymerization by reaction with a suitable crosslinking agent, such as di/poly-epoxides, di/poly-alcohols, di/poly-haloalkanes, etc. SAP is typically provided in particulate form, which is produced from a slab of material with any typical size reduction techniques, such as milling.

In some embodiments, SAP is provided in a composition comprising SAP (e.g., an aqueous SAP hydrogel). In some embodiments, a composition comprises SAP and water. In some embodiments, a composition comprises SAP and ethylene glycol. In some embodiments, a composition comprises SAP, water, and ethylene glycol. The water in the composition can be reverse osmosis water, regular tap water, or water containing dissolved inorganic salts at various salt concentrations (e.g., sodium chloride (e.g., 0.9% (w/v) solution of sodium chloride)). In some embodiments, other salts (e.g., comprising monovalent cations, having higher ionic strength, etc.) are used to reduce the viscosity of a composition comprising SAP or alternatively to provide a higher SAP concentration in the composition. A non-limiting example of a viscosity reducing salt is sodium sulfate.

In some embodiments, compositions comprising SAP also comprise a free radical producing chemical compound.

Nonlimiting examples of such chemical compounds are hydrogen peroxide ($H_2O_2$), persulfate (e.g., sodium persulfate or potassium persulfate), perborate, perphosphate, percarbonate, diazo compounds, ozone, organic free radical initiators (e.g. di-ter-butyl peroxide (DTBP)), combinations thereof, etc.

In some embodiments, compositions comprise SAP at a concentration greater than 0.25% (w/v), greater than 0.50% (w/v), greater than 1.0% (w/v), greater than 2.0% (w/v), greater than 5.0% (w/v), or greater than 10.0% (w/v). For example, in some embodiments, compositions comprise SAP at a concentration of at least 0.25 to 10.0% (w/v) (e.g., at least 0.25, 0.50, 0.75, 1.00, 1.25, 1.50, 1.75, 2.00, 2.25, 2.50, 2.75, 3.00, 3.25, 3.50, 3.75, 4.00, 4.25, 4.50, 4.75, 5.00, 5.25, 5.50, 5.75, 6.00, 6.25, 6.50, 6.75, 7.00, 7.25, 7.50, 7.75, 8.00, 8.25, 8.50, 8.75, 9.00, 9.25, 9.50, 9.75, or 10.00% (w/v)).

In some embodiments, the viscosity of compositions comprising SAP is higher than 200 Pa·s (or equivalently, 200,000 cP).

The non-renewable energy use (NREU) to make acrylic acid (AA) from the fossil-derived propylene is estimated to be approximately 50 MJ/kg SAP (equivalently, 50 MJ/kg AA). Therefore, embodiments of the technology providing an improved degradation of SAP (e.g., relative to extant methods) expend less energy than the NREU to make AA, e.g., a maximum specific energy ($w_{max}$) of less than 50 MJ/kg SAP.

Degradation

The technology relates to degrading (e.g., depolymerizing and/or de-crosslinking) polymers (e.g., SAP) to produce polymer fragments (e.g., PAA). In some embodiments, degrading comprises inputting energy into a polymer (e.g., a composition comprising a polymer). In some embodiments, degrading comprises inputting sound energy (e.g., vibration) into a polymer (e.g., a composition comprising a polymer). In some embodiments, the technology comprises use of an apparatus that produces acoustic cavitation in a liquid (e.g., using ultrasonic vibration). Acoustic cavitation arises from pressure variations in a liquid produced using high frequency sound waves (e.g., frequencies in the range of 16 kHz- 5 MHz (e.g., 15, 20, 25, 30, 35, 40, 45, 50, 55, 60, 65, 70, 75, 80, 85, 90, 95, 100, 100, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, 3000, 3050, 3100, 3150, 3200, 3250, 3300, 3350, 3400, 3450, 3500, 3550, 3600, 3650, 3700, 3750, 3800, 3850, 3900, 3950, 4000, 4050, 4100, 4150, 4200, 4250, 4300, 4350, 4400, 4450, 4500, 4550, 4600, 4650, 4700, 4750, 4800, 4850, 4900, 4950, or 5000 kHz). If a sufficiently large negative pressure is applied to a liquid so that the average distance between the molecules exceeds the critical molecular distance required to hold the liquid intact, cavities or voids are created. Subsequent compression and rarefaction cycles of the sound waves cause the cavity to expand, reach a maximum cavity size (the magnitude of which depends on the operating conditions), and then collapse releasing energy. The magnitude of the pressure pulse or the temperature generated depends on the operating conditions, e.g., the intensity of the irradiation, the frequency of irradiation, and the physicochemical properties of the liquid medium (e.g., which decides the initial size of the nuclei generated in the reactor and the ease of generation of cavitation).

Cavitation of liquids can be produced, e.g., using a swiftly moving solid body (as an impeller), hydrodynamically, or by high-frequency sound waves (e.g., sonication). In some embodiments, a component of an apparatus for producing cavitation in a liquid (e.g., sonicator) is a transducer that converts supplied electrical energy into mechanical energy (e.g., vibrations) that produces sound energy that propagates though the liquid. The dissipation of the sound energy into the medium results in the generation of a cavitation field. In some embodiments, transducers operate at a fixed frequency of irradiation and emit radiations through a fixed area of irradiation. The type of transducer coupled with the total area of irradiation and the operating frequency are some important factors that relate to the efficiency of the transducer. Three types of exemplary transducers are: a) gas driven; b) liquid driven; and c) electromechanical transducers. Gas-driven transducers are whistles that produce high frequencies in gases such as, e.g., dog whistles and sirens. Similarly, liquid-driven transducers ("liquid whistles") produce high frequency sound energy and cavitation in liquids. Electromechanical transducers ("sonicators") include, e.g., piezoelectric, magnetostrictive, and capacitive transducers. Piezoelectric transducers are constructed using a piezoelectric material, such as quartz, which expands and contracts in an oscillating electric field producing sound waves (pressure waves) from the electric signal. Magnetostrictive transducers are constructed from materials, such as nickel alloys, that expand and contract in an alternating magnetic field. Capacitive transducers use electrostatic fields between a conductive diaphragm and a backing plate. An example of a sonicator is a Sonics and Materials Vibra-cell VCX 600 Ultrasonic Liquid Processor.

In some embodiments, the technology comprises use of a sonicator that provides high-frequency sound waves at ultrasonic frequencies (e.g., greater than 18 kHz (e.g., 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0 kHz). In some embodiments, the technology comprises use of a sonicator that provides high-frequency sound waves at approximately 20 kHz.

In some embodiments, the technology comprises adding aqueous base to SAP and sonicating the base-treated (e.g., partially de-crosslinked) SAP. In some embodiments, the technology comprises adding aqueous base (e.g., NaOH (e.g., approximately 0.3 to 3 M NaOH (e.g., approximately 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, or 3.5 M NaOH))) to SAP (e.g., approximately 0.5 to 10.0% w/v SAP (e.g., 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0% w/v SAP) and stirring (e.g., at approximately 80° C. (e.g., 75.0, 75.1, 75.2, 75.3, 75.4, 75.5, 75.6, 75.7, 75.8, 75.9, 76.0, 76.1, 76.2, 76.3, 76.4, 76.5, 76.6, 76.7, 76.8, 76.9, 77.0, 77.1, 77.2, 77.3, 77.4, 77.5, 77.6, 77.7, 77.8, 77.9, 78.0, 78.1, 78.2, 78.3, 78.4, 78.5, 78.6, 78.7, 78.8, 78.9, 79.0, 79.1, 79.2, 79.3, 79.4, 79.5, 79.6, 79.7, 79.8, 79.9, 80.0, 80.1, 80.2, 80.3, 80.4, 80.5, 80.6, 80.7, 80.8, 80.9, 81.0, 81.1, 81.2, 81.3, 81.4, 81.5, 81.6, 81.7, 81.8, 81.9, 82.0, 82.1, 82.2, 82.3, 82.4, 82.5, 82.6, 82.7, 82.8, 82.9, 83.0, 83.1, 83.2, 83.3, 83.4, 83.5, 83.6, 83.7, 83.8, 83.9, 84.0, 84.1, 84.2, 84.3, 84.4, 84.5, 84.6, 84.7, 84.8, 84.9, or 85.0° C.) for approximately 5 to 24 hours (e.g., 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, or 24.0 hours)) to provide partially de-crosslinked SAP, e.g., comprising at least 60% (e.g., at least 60, 65, 70, 75, 80, or 85%) soluble fragments (e.g., as confirmed by mass recovery). Next, in some embodiments, methods comprise sonicating the partially de-crosslinked SAP hydrogel. In some embodiments, the SAP is sonicated (e.g., at approximately 20 kHz) for approximately 20 minutes (e.g., 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, or 25.0 minutes). In some embodiments, the SAP is sonicated (e.g., at approximately 20 kHz) for approximately 1 to 20 minutes (e.g., approximately 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, or 25.0 minutes). In some embodiments, the SAP is sonicated using high-frequency sound waves at ultrasonic frequencies (e.g., greater than 18 kHz (e.g., 18.0, 18.1, 18.2, 18.3, 18.4, 18.5, 18.6, 18.7, 18.8, 18.9, 19.0, 19.1, 19.2, 19.3, 19.4, 19.5, 19.6, 19.7, 19.8, 19.9, 20.0, 20.1, 20.2, 20.3, 20.4, 20.5, 20.6, 20.7, 20.8, 20.9, 21.0, 21.1, 21.2, 21.3, 21.4, 21.5, 21.6, 21.7, 21.8, 21.9, 22.0, 22.1, 22.2, 22.3, 22.4, 22.5, 22.6, 22.7, 22.8, 22.9, 23.0, 23.1, 23.2, 23.3, 23.4, 23.5, 23.6, 23.7, 23.8, 23.9, 24.0, 24.1, 24.2, 24.3, 24.4, 24.5, 24.6, 24.7, 24.8, 24.9, 25.0, 25.1, 25.2, 25.3, 25.4, 25.5, 25.6, 25.7, 25.8, 25.9, 26.0, 26.1, 26.2, 26.3, 26.4, 26.5, 26.6, 26.7, 26.8, 26.9, 27.0, 27.1, 27.2, 27.3, 27.4, 27.5, 27.6, 27.7, 27.8, 27.9, 28.0, 28.1, 28.2, 28.3, 28.4, 28.5, 28.6, 28.7, 28.8, 28.9, 29.0, 29.1, 29.2, 29.3, 29.4, 29.5, 29.6, 29.7, 29.8, 29.9, 30.0, 30.1, 30.2, 30.3, 30.4, 30.5, 30.6, 30.7, 30.8, 30.9, 31.0, 31.1, 31.2, 31.3, 31.4, 31.5, 31.6, 31.7, 31.8, 31.9, 32.0, 32.1, 32.2, 32.3, 32.4, 32.5, 32.6, 32.7, 32.8, 32.9, 33.0, 33.1, 33.2, 33.3, 33.4, 33.5, 33.6, 33.7, 33.8, 33.9, 34.0, 34.1, 34.2, 34.3, 34.4, 34.5, 34.6, 34.7, 34.8, 34.9, 35.0, 35.1, 35.2, 35.3, 35.4, 35.5, 35.6, 35.7, 35.8, 35.9, 36.0, 36.1, 36.2, 36.3, 36.4, 36.5, 36.6, 36.7, 36.8, 36.9, 37.0, 37.1, 37.2, 37.3, 37.4, 37.5, 37.6, 37.7, 37.8, 37.9, 38.0, 38.1, 38.2, 38.3, 38.4, 38.5, 38.6, 38.7, 38.8, 38.9, 39.0, 39.1, 39.2, 39.3, 39.4, 39.5, 39.6, 39.7, 39.8, 39.9, or 40.0 kHz) for approximately 1 to 20 minutes (e.g., approximately 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, or 25.0 minutes).

In some embodiments, the maximum specific energy ($w_{max}$) provided to degrade SAP to PAA is less than 50 MJ/kg SAP (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 MJ/kg SAP). In some embodiments, the maximum specific energy ($w_{max}$) provided to degrade SAP to PAA is less than 50 MJ/kg SAP (e.g., less than 50, 49, 48, 47, 46, 45, 44, 43, 42, 41, 40, 39, 38, 37, 36, 35, 34, 33, 32, 31, 30, 29, 28, 27, 26, 25, 24, 23, 22, 21, 20, 19, 18, 17, 16, 15, 14, 13, 12, 11, 10, 9, 8, 7, 6, 5, 4, or 3 MJ/kg SAP) and the PAA has a $M_w$ of approximately 1200 kg/mol or less (e.g., 1200, 1150, 1100, 1050, 1000, 950, 900, 850, 800, 750, 700, 650, 600, 550, 500, 450, 400, 350, 300, 250, 200, 150, or 100 kg/mol), a $M_w$ of approximately 500 kg/mol or less (e.g., less than 500, 475, 450, 425, 400, 375, 350, 325, 300, 275, 250, 225, 200, 175, 150, 125, 100, 75, or 50 kg/mol), a $M_w$ of approximately 400 kg/mol or less (e.g., less than 400, 375, 350, 325, 300, 275, 250, 225, 200, 175, 150, 125, 100, 75, or 50 kg/mol), a $M_w$ of approximately 300 kg/mol or less (e.g., less than 300, 275, 250, 225, 200, 175, 150, 125, 100, 75, or 50 kg/mol), a $M_w$ of approximately 250 kg/mol or less (e.g., less than 250, 240, 230, 220, 210, 200, 190, 180, 170, 160, 150, 140, 130, 120, 110, 100, 90, 80, 70, 60, or 50 kg/mol), or a $M_w$ of approximately 200 kg/mol or less (e.g., less than 250, 245, 240, 235, 230, 225, 220, 215, 210, 205, 200, 195, 190, 185, 180, 175, 170, 165, 160, 155, 150, 145, 140, 135, 130, 125, 120, 115, 110, 105, 100, 95, 90, 85, 80, 75, 70, 65, 60, 55, or 50 kg/mol).

In some embodiments, the technology recovers PAA from SAP at a rate of at least 80% (e.g., at least 80.0, 80.5, 81.0, 81.5, 82.0, 82.5, 83.0, 83.5, 84.0, 84.5, 85.0, 85.5, 86.0, 86.5, 87.0, 87.5, 88.0, 88.5, 89.0, 89.5, 90.0, 90.5, 91.0, 91.5, 92.0, 92.5, 93.0, 93.5, 94.0, 94.5, or 95.0%).

PAA

In some embodiments, the degradation technology provided herein produces PAA (e.g., a composition comprising PAA). In some embodiments, the degradation technology provided herein produces a composition comprising PAA and SAP. In some embodiments, the PAA has a $M_w$ of approximately 1200 kg/mol or less (e.g., less than 1200, 1150, 1100, 1050, 1000, 950, 900, 850, 800, 750, 700, 650, 600, 550, 500, 450, 400, 350, 300, 250, 200, 150, or 100 kg/mol). In some embodiments, the PAA has a $M_w$ of approximately 500 kg/mol or less (e.g., less than 500, 475, 450, 425, 400, 375, 350, 325, 300, 275, 250, 225, 200, 175, 150, 125, 100, 75, or 50 kg/mol), a $M_w$ of approximately 400 kg/mol or less (e.g., less than 400, 375, 350, 325, 300, 275, 250, 225, 200, 175, 150, 125, 100, 75, or 50 kg/mol), a $M_w$ of approximately 300 kg/mol or less (e.g., less than 300, 275, 250, 225, 200, 175, 150, 125, 100, 75, or 50 kg/mol), a $M_w$ of approximately 250 kg/mol or less (e.g., less than 250, 240, 230, 220, 210, 200, 190, 180, 170, 160, 150, 140, 130, 120, 110, 100, 90, 80, 70, 60, or 50 kg/mol), or a $M_w$ of approximately 200 kg/mol or less (e.g., less than 250, 245, 240, 235, 230, 225, 220, 215, 210, 205, 200, 195, 190, 185, 180, 175, 170, 165, 160, 155, 150, 145, 140, 135, 130, 125, 120, 115, 110, 105, 100, 95, 90, 85, 80, 75, 70, 65, 60, 55, or 50 kg/mol).

In some embodiments, the PAA has a dispersity (Đ) less than 10. In some embodiments, the PAA has a dispersity (Đ) less than 6. In some embodiments, the PAA has a dispersity (Đ) less than 4. In some embodiments, the PAA has a dispersity (Đ) less than 2. In some embodiments, the PAA has a dispersity of approximately 1.0 to 3.0 (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0). In some embodiments, the PAA has a dispersity of approximately 1.0 to 10.0 (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0). In some embodiments, dispersity is the ratio of the weight-average molecular weight to the number-average molecular weight. In some embodiments, these molecular weights are measured by SEC as it is known to those skilled in the art.

The steady viscosity of the PAA product typically corresponds to a shear rate of 4 $s^{-1}$. Depending on the PAA concentration and molecular weight, the viscosity of the PAA product, in some embodiments, is as low as 1 mPa·s (or equivalently, 1 cP), which is nearly the viscosity of water. The ratio of the viscosity of the SAP to that of the PAA product is the viscosity reduction ratio (or simply, viscosity ratio), and it indicates the extent of the SAP degradation to PAA. The negative logarithm of the viscosity ratio measures the change in orders of magnitude between the viscosity of the SAP and the PAA product. In some embodiments, the negative logarithm of the viscosity ratio is less than approximately 6. In some embodiments, the negative logarithm of the viscosity ratio is less than approximately 4. In some embodiments, the negative logarithm of the viscosity ratio is less than approximately 2.

Uses

In some embodiments, the PAA product is incorporated into virgin SAP (thus increasing its recycled content and supporting the circular economy of SAP) and/or derivatized into materials for other applications such as adhesives, coatings, water treatment, etc. In some embodiments, PAA is fed into a process to make SAP from acrylic acid. In some embodiments, PAA is used to make an adhesive. In some embodiments, PAA is used to make paint, a coating, or a binder. In some embodiments, PAA is derivatized for use as an adhesive. In some embodiments, PAA and/or derivatized PAA is used in fabric care applications. In some embodiments, PAA and/or derivatized PAA is used in water treatment applications.

In some embodiments, PAA is extracted from SAP degradation products (e.g., produced according to embodiments of the degradation technology described herein) using a number of processes, e.g., water evaporation, PAA filtration, water extraction, etc. In some embodiments, salts present in the PAA product from the use of SAP in AHPs are removed via any desalination technique known to those skilled in the art, e.g., membrane processes (e.g. reverse osmosis, forward osmosis, electrodialysis reversal (EDR), nanofiltration, etc.), freezing desalination, solar desalination, geothermal desalination, ion exchange, wave powered desalination, etc.

EXAMPLES

During the development of embodiments of the technology provided herein, experiments were conducted to produce degraded fragments from polyacrylate salt-based superabsorbent polymers by treatment with basic solution and sonication.

Materials and Methods

Chemicals—All chemicals were used as received unless otherwise mentioned. Poly(acrylic acid) (PAA) with molecular weight listed as 750 kg/mol ($PAA_{SPP}$) was purchased from Scientific Polymer Products. Dimethyl sulfoxide (DMSO), sodium hydroxide (NaOH), and sodium nitrate ($NaNO_3$) were purchased from Millipore Sigma. Methanol (MeOH) and sodium chloride (NaCl) were purchased from Fisher Scientific. Sodium polyacrylate ($PAA_{P\&G}$) was provided by Procter & Gamble Co. Sonicated polymer fragments were dialyzed in deionized (DI) water using Spectra/Por molecular porous membrane tubing (molecular weight cut-off: 3.5 kg/mol). Pressure tube vessels were purchased from Thomas Scientific. Jacketed beakers were purchased from Sigma Aldrich (catalog number Z202738-1EA).

Sonication—Sonication was performed at 100% amplitude (amp) using a Sonics and Materials Vibra-cell VCX 600 Ultrasonic Liquid Processor equipped with a 13-mm replaceable tip probe. A 3.5-cm inner diameter, 9-cm height jacketed beaker was used for all sonication procedures. Cold water (10-15° C.) was flowed through the jacket while stirring the polymer solution at 500 rpm. A thermocouple was immersed into the polymer solution to monitor temperature. The temperature was generally observed to increase to 45-50° C. from 10-15° C. during sonication. The power from the outlet was monitored using a kill-a-watt meter (#P4400). The maximum power ($P_{max}$) reading observed at the beginning of sonication was recorded. The maximum specific energy ($w_{max}$) for chain-shortening PAA of mass (m) for time (t) was determined using Equation 1.

$$w_{max}(J/kg) = \frac{P_{max}(W) \times t(s)}{m(kg)} \quad (1)$$

NMR spectroscopy—Unless otherwise noted, $^1H$ and $^{13}C$ NMR spectra for all compounds were acquired at room temperature. Chemical shift data are reported in units of $\delta$ (ppm) relative to tetramethylsilane (TMS) and referenced with residual solvent. Multiplicities are reported as follows: singlet (s), doublet (d), doublet of doublets (dd), triplet (t), quartet (q), multiplet (m), and broad resonance (br). Residual water is denoted by an asterisk (*). For all $^1H$ NMR spectra recorded for polymers, a 5-s acquisition time was used with a 25-s relaxation delay in between each pulse.

Size Exclusion Chromatography (SEC) for $PAA_{SPP}$ and $PAA_{P\&G}$ fragments—Sonicated $PAA_{SPP}$ and $PAA_{P\&G}$ fragments were diluted (to 1-1.5 mg/mL) with 0.1 M $NaNO_3$ (aq)/ethylene glycol (99:1 v/v) and filtered through a TITAN3 Nylon syringe filter (0.45 µm) into a SEC vial. Polymer molecular weight (M) and dispersity (Đ) were determined by comparison with PEG/PEO EasiVial standards from Agilent at 40° C. in 0.1 M $NaNO_3$ (aq) on a Waters SEC (Waters 1515 Isocratic HPLC pump, 717 plus autosampler, RI detector Model 214 and UV-PDA detector Model 487) equipped with four Ultrahydrogel columns: 120 (WAT011565), 250 (WAT011525), 500 (WAT011530), and 1000 (WAT011535).

Example 1—Recovery of Sonicated Fragments

During the development of embodiments of the technology provided herein, experiments were conducted to evaluate the recovery and chemical structure of sonicated polymer fragments after sonication of polyacrylic acid. Three batches of 0.50% w/v PAA solution were prepared by dissolving $PAA_{SPP}$ (750 kg/mol, 250 mg, 3.47 mmol) with DI $H_2O$ (50.0 mL each) in jacketed beakers equipped with stir bars. The PAA solutions were stirred at 300 rpm for 15 hours at room temperature. Then, the PAA solutions were sonicated for 20 minutes. Next, the polymer solutions were concentrated under reduced pressure to dryness, spiked with a known amount of DMSO (1.14, 1.16, and 1.09 mmol, respectively) and redissolved with $D_2O$ for quantitative $^1H$-NMR spectroscopic analysis (FIG. 1). Features of the NMR spectra were evaluated to confirm maintenance of the PAA chemical structure in the sonicated compositions (FIG. 1). In particular, a 1:2 ratio of peaks b and c was used to confirm the presence of carboxyl groups in the sonicated preparations. An average recovery of 87% was determined based on relative integrations (Table 1). In particular, the average recovery of sonicated fragments after sonication was determined using Equation 2 and the amount of DMSO (mmol), the mass of polymer sonicated (250 mg), the molar mass of the PAA repeat unit (72.06 g/mol), and the normalized integration for peak a ($I_s$) calculated from three independent trials.

$$\text{recovery (\%)} = \frac{DMSO(\text{mmol}) \times I_a \times 72.06 \frac{g}{mol}}{250 \text{ mg}} \times 100 \quad (2)$$

TABLE 1

Recovery of sonicated fragments

| trial | DMSO (mmol) | $I_a$ | recovery (%) |
|---|---|---|---|
| 1 | 1.14 | 2.6 | 85 |
| 2 | 1.16 | 2.6 | 87 |
| 3 | 1.09 | 2.8 | 88 |
| avg | | | 87 |

Example 2—Effect of Time on Sonication of $PAA_{SPP}$

During the development of embodiments of the technology provided herein, experiments were conducted to evaluate the polymer fragments produced by sonication of PAA as a function of the length of the sonication time. Triplicate batches of $PAA_{SPP}$ solution (0.50%, 1.0%, and 2.5% w/v) were prepared by dissolving PAA with deionized $H_2O$ (50 mL each) in jacketed beakers equipped with stir bars. NaCl (100 mg, 1.71 mmol) was added to the 1.0% and 2.5% batches to lower the solution viscosity. The 0.50%, 1.0%, and 2.5% w/v PAA solutions were stirred at 300 rpm for 15 hours at room temperature. Triplicate batches of $PAA_{SPP}$ at 5.0% w/v were produced by slowly adding $PAA_{SPP}$ (7500 mg) to a 500-mL glass bottle containing DI $H_2O$ (150 mL) while vigorously stirring with a large stir bar. NaCl (300 mg, 5.13 mmol) was added to lower the solution viscosity. The 5.0% w/v PAA solutions were stirred at 300 rpm for 24 hours at room temperature. Thereafter, portions of this 5.0% w/v PAA solution (50 mL) were transferred to jacketed beakers. The PAA solutions were sonicated for 20 minutes while collecting 0.50-1.0 mL aliquots at 1, 2, 5, 10, 15, and 20 minutes. The temperature was observed to increase to approximately 45-50° C. during irradiation. The aliquots were diluted to 1-1.5 mg/mL with 0.1 M $NaNO_3$ (aq)/ethylene glycol (99:1 v/v) and analyzed via SEC.

SEC retention time measurements for 0.50%, 1.0%, 2.5%, and 5.0% w/v $PAA_{SPP}$ are provided in FIGS. 2, 3, 4, and 5, respectively. Weight average molecular weight ($M_w$), dispersity (Đ), and maximum specific energy ($w_{max}$) data collected for 0.50%, 1.0%, 2.5%, and 5.0% w/v $PAA_{SPP}$ are provided in Tables 2, 3, 4, and 5, respectively. $M_w$ and Đ values in Table 5 marked with an asterisk (*) lie beyond the calibration upper limit (1100 kg/mol). Maximum specific energy ($w_{max}$) values were determined using Equation 1. Measurements of the maximum power ($P_{max}$) consumed from the power outlet during sonication of 0.50%, 1.0%, 2.5%, and 5.0% w/v $PAA_{SPP}$ are provided in Table 6. Plots of $M_w$ and maximum specific energy ($w_{max}$) versus time for 0.50%, 1.0%, 2.5%, and 5.0% $PAA_{SPP}$ w/v are provided in FIGS. 6, 7, 8, and 9, respectively.

TABLE 2

$M_w$, Đ, and $w_{max}$ for sonications of 0.50% w/v $PAA_{SPP}$

| time | run 1 | | | run 2 | | |
|---|---|---|---|---|---|---|
| (min) | $M_w$ (kg/mol) | Đ | $w_{max}$ | $M_w$ (kg/mol) | Đ | $w_{max}$ |
| 1 | 440 | 2.4 | 53 | 480 | 3.0 | 55 |
| 2 | 270 | 1.8 | 110 | 300 | 2.4 | 110 |
| 5 | 130 | 1.4 | 260 | 140 | 1.7 | 280 |
| 10 | 88 | 1.3 | 530 | 93 | 1.4 | 550 |
| 15 | 78 | 1.4 | 790 | 73 | 1.3 | 830 |
| 20 | 65 | 1.3 | 1100 | 64 | 1.3 | 1100 |

TABLE 3

$M_w$, Đ, and $w_{max}$ for sonications of 1.0% w/v $PAA_{SPP}$

| time | run 1 | | | run 2 | | |
|---|---|---|---|---|---|---|
| (min) | $M_w$ (kg/mol) | Đ | $w_{max}$ | $M_w$ (kg/mol) | Đ | $w_{max}$ |
| 1 | 600 | 2.9 | 29 | 540 | 2.8 | 29 |
| 2 | 340 | 2.3 | 58 | 420 | 2.6 | 58 |
| 5 | 190 | 1.8 | 140 | 190 | 1.8 | 140 |
| 10 | 120 | 1.5 | 290 | 120 | 1.6 | 290 |
| 15 | 93 | 1.5 | 430 | 90 | 1.4 | 430 |
| 20 | 76 | 1.3 | 580 | 79 | 1.4 | 580 |

TABLE 4

$M_w$, Đ, and $w_{max}$ for sonications of 2.5% w/v $PAA_{SPP}$

| time | run 1 | | | run 2 | | |
|---|---|---|---|---|---|---|
| (min) | $M_w$ (kg/mol) | Đ | $w_{max}$ | $M_w$ (kg/mol) | Đ | $w_{max}$ |
| 1 | 880 | 5.3 | 12 | 1200 | 6.1 | 12 |
| 2 | 530 | 3.7 | 25 | 550 | 3.7 | 25 |
| 5 | 250 | 2.6 | 62 | 320 | 2.5 | 62 |
| 10 | 190 | 2.2 | 125 | 210 | 2.0 | 125 |
| 15 | 150 | 1.9 | 187 | 150 | 2.1 | 187 |
| 20 | 120 | 1.7 | 250 | 120 | 1.9 | 250 |

TABLE 5

$M_w$, Đ, and $w_{max}$ for sonications of 5.0% w/v $PAA_{SPP}$

| time | run 1 | | | run 2 | | |
|---|---|---|---|---|---|---|
| (min) | $M_w$ (kg/mol) | Đ | $w_{max}$ | $M_w$ (kg/mol) | Đ | $w_{max}$ |
| 1 | 2200* | 9.9* | 7.0 | 2600* | 8.9* | 7.0 |
| 2 | 1900* | 5.4* | 14 | 1900* | 6.7* | 14 |
| 5 | 1200 | 4.5 | 35 | 1200 | 4.7 | 35 |
| 10 | 730 | 2.6 | 70 | 770 | 3.0 | 70 |
| 15 | 470 | 2.1 | 105 | 460 | 2.2 | 105 |
| 20 | 350 | 2.0 | 140 | 350 | 2.2 | 140 |

TABLE 6

$P_{max}$ consumed during sonication of $PAA_{SPP}$

| PAA (w/v %) | mass (mg) | amount (mmol) | run 1 $P_{max}$ (W) | run 2 $P_{max}$ (W) |
|---|---|---|---|---|
| 0.50 | 250 | 3.47 | 220 | 230 |
| 1.0 | 500 | 6.94 | 240 | 240 |

TABLE 6-continued $P_{max}$ consumed during sonication of $PAA_{SPP}$

| PAA (w/v %) | mass (mg) | amount (mmol) | run 1 $P_{max}$ (W) | run 2 $P_{max}$ (W) |
|---|---|---|---|---|
| 2.50 | 1250 | 17.3 | 260 | 260 |
| 5.0 | 2500 | 34.6 | 290 | 290 |

The data collected indicated that longer sonication produced smaller degraded fragments (see, e.g., FIGS. 2, 3, 4, and 5 and Tables 2, 3, 4, and 5). The data indicated that the sonication produced degraded fragments having a weight average molecular weight ($M_w$) of approximately 50 to 3000 kg/mol (e.g., approximately 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or 3000 kg/mol). The $M_w$ decreased with increased sonication time and increased with increased $PAA_{SPP}$ concentration. The data indicated that the degraded fragments had a dispersity (Đ) of approximately 1.0 to 10.0 (e.g., approximately 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, or 10.0). Dispersity decreased with increasing sonication time and increased with increasing $PAA_{SPP}$ concentration. The maximum power ($P_{max}$) from the power outlet during sonication increased as a function of increasing $PAA_{SPP}$ concentration. Plots of $M_w$ versus sonication time indicated that sonication for approximately 20 minutes (e.g., 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, or 25.0 minutes) resulted in nearly complete degradation into fragments as shown by the plateaus of the curves connecting the data points. Degradation was substantially complete at 5 minutes of sonication with minimal additional degradation observed from 5 to 20 minutes (FIGS. 6, 7, 8, and 9). Plots of maximum specific energy ($w_{max}$) versus sonication time were linear.

Example 3—Effect of Time on Sonication of $PAA_{P\&G}$

During the development of embodiments of the technology provided herein, experiments were conducted to test the effect of sonication time on degradation of $PAA_{P\&G}$ at 5.0% w/v. A batch of 5.0% w/v de-crosslinked $PAA_{P\&G}$ hydrogel was prepared by stirring $PAA_{P\&G}$ (10 g) in NaOH(aq) (0.3 M, 200 mL) in a 500-mL glass bottle at 80° C. for 24 hours. A portion of the de-crosslinked $PAA_{P\&G}$ hydrogel (50 mL) was poured into a jacketed beaker equipped with a stir bar. The $PAA_{P\&G}$ hydrogels were sonicated and aliquots of 0.50-1.00 mL were collected after 1, 2, 3, 5, and 10 minutes of sonication. The temperature was observed to increase to approximately 45-50° C. during irradiation. The aliquots were diluted with deionized water (5 mL) and dialyzed overnight in deionized water to remove NaOH. The aliquots were diluted to 1.0-1.5 mg/mL with 0.1 M NaNO$_3$ (aq)/ethylene glycol (99:1 v/v) and analyzed via SEC.

Figure 10:
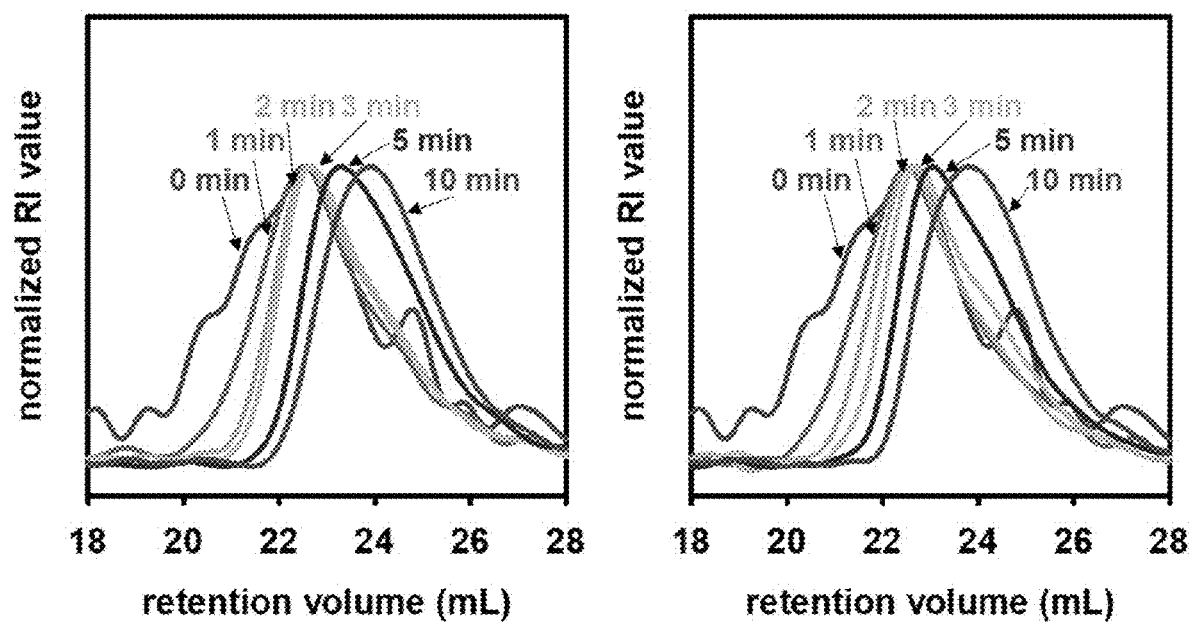
FIG. 10 shows SEC traces for two trials of sonicated $PAA_{P\&G}$ at 5.0% w/v. Labels indicate elution peaks for samples sonicated for 0, 1, 2, 3, 5, and 10 minutes.
Figure 11:
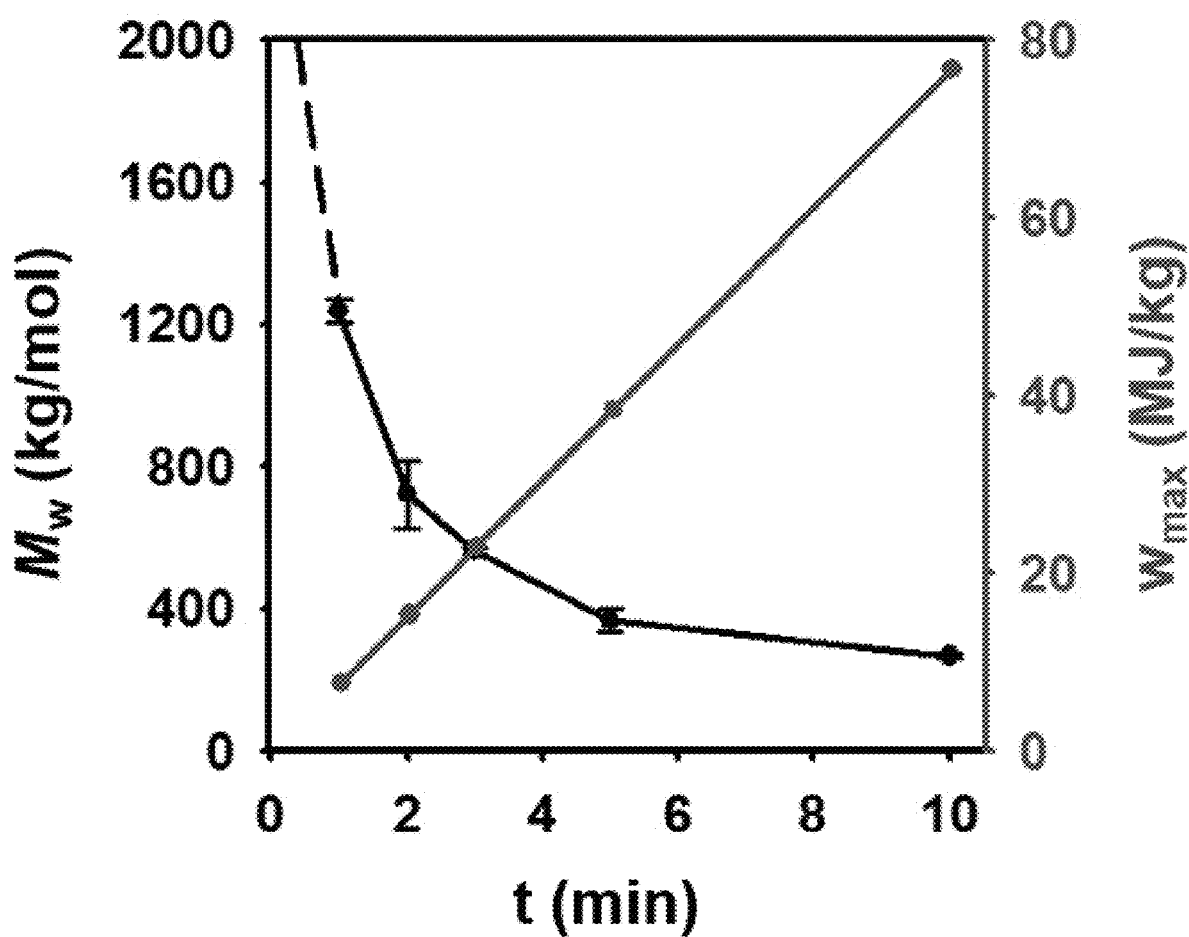
FIG. 11 shows a plot of $M_w$ and maximum specific energy ($w_{max}$) versus time for the sonication of $PAA_{P\&G}$ at 5.0% w/v.

SEC retention time measurements for sonications of de-crosslinked $PAA_{P\&G}$ at 5.0% w/v are provided in FIG. 10. Weight average molecular weight dispersity (Đ), and maximum specific energy ($w_{max}$) data for sonications of de-crosslinked $PAA_{P\&G}$ at 5.0% w/v are provided in Table 7. $M_w$ and Đ values marked with an asterisk (*) lie beyond the calibration upper limit (1100 kg/mol). Measurements of the maximum power ($P_{max}$) from the power outlet during sonication are provided in Table 8. Plots of $M_w$ and maximum specific energy ($w_{max}$) versus time are provided in FIG. 11.

TABLE 7

$M_w$, Đ, and $w_{max}$ for sonications of 5.0% w/v $PAA_{P\&G}$

| time (min) | run 1 | | | run 2 | | |
|---|---|---|---|---|---|---|
| | $M_w$ (kg/mol) | Đ | $w_{max}$ | $M_w$ (kg/mol) | Đ | $w_{max}$ |
| 0 | 2400* | 5.4* | 0 | 2500* | 5.4* | 0 |
| 1 | 1300 | 3.2 | 7.7 | 1200 | 3.2 | 7.7 |
| 2 | 790 | 2.3 | 15 | 660 | 2.2 | 15 |
| 3 | 570 | 2.2 | 23 | 560 | 2.1 | 23 |
| 5 | 390 | 1.7 | 38 | 340 | 1.8 | 38 |
| 10 | 260 | 1.7 | 77 | 270 | 1.5 | 77 |

TABLE 8

$P_{max}$ consumed during sonication of $PAA_{P\&G}$

| PAA (w/v %) | mass (mg) | mmol | run 1 $P_{max}$ (W) | run 2 $P_{max}$ (W) |
|---|---|---|---|---|
| 5.0 | 2500 | 26.6 | 320 | 320 |

The data collected indicated that longer sonication produced smaller degraded fragments (see, e.g., FIG. 10 and Table 7). The data indicated that the sonication produced degraded fragments having a weight average molecular weight ($M_w$) of approximately 250 to 3000 kg/mol (e.g., approximately 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000, 2050, 2100, 2150, 2200, 2250, 2300, 2350, 2400, 2450, 2500, 2550, 2600, 2650, 2700, 2750, 2800, 2850, 2900, 2950, or 3000 kg/mol). The $M_w$ decreased with increased sonication time. The data indicated that the degraded fragments had a dispersity (Đ) of approximately 1.5 to 6.0 (e.g., approximately 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0). Dispersity decreased with increasing sonication time. A plot of $M_w$ versus sonication time indicated that sonication for approximately 10 minutes (e.g., 7.5, 8.0, 8.5, 9.0, 9.5, 10.0, 10.5, 11.0, 11.5, 12.0, or 12.5 minutes) resulted in nearly complete degradation into fragments as shown by the plateau of the curve connecting the data points. A plot of maximum specific energy ($w_{max}$) versus sonication time was linear.

Example 4—Sonicating with NaCl and/or NaOH

Figure 12:
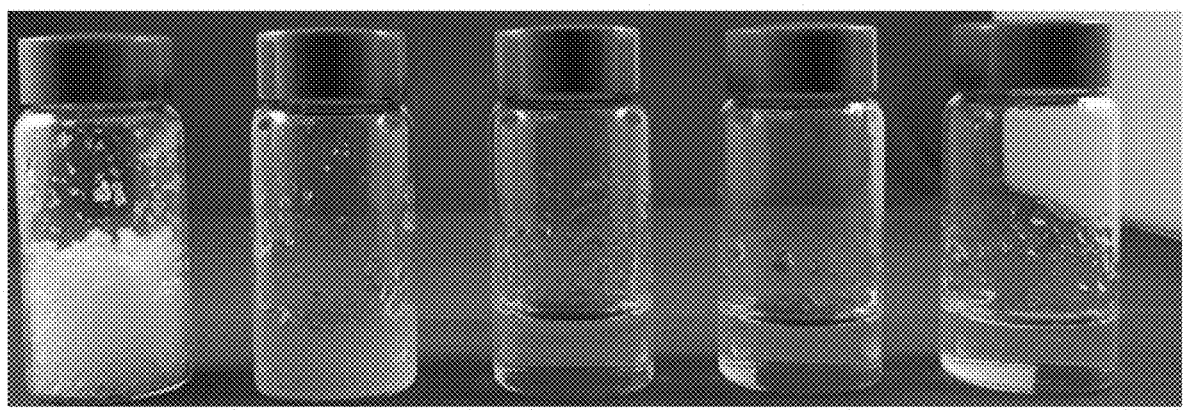
FIG. 12 shows samples of 5% w/v $PAA_{SPP}$ treated with NaCl or NaOH. Vials from left to right comprised 5.0% w/v $PAA_{SPP}$ in deionized water, 5.0% w/v $PAA_{SPP}$ in 0.1 M NaCl, 5.0% w/v $PAA_{SPP}$ in 3 M NaOH after 5 hours at 80° C., 5.0% w/v $PAA_{SPP}$ in 1 M NaOH after 5 hours at 80° C., and 5.0% w/v $PAA_{SPP}$ in 0.3 NaOH after 24 hours at 80° C.

During the development of embodiments of the technology provided herein, experiments were conducted to test adjusting the viscosity and absorbent capacity of SAP hydrogels and sonicating SAP hydrogels comprising NaCl and/or NaOH. SAP is highly absorbent; accordingly, data collected during experiments indicated that sonication does not degrade and/or does not sufficiently degrade SAP at concentrations of SAP in aqueous hydrogels greater than approximately 1% w/v. Without being constrained to theory, it is contemplated that the SAP in an SAP hydrogel of 1% or greater w/v absorbs all the water and therefore no water is available for cavitation during sonication. Experiments were conducted in which the viscosity and/or turbidity of SAP hydrogels was evaluated in the presence of NaCl or NaOH (FIG. 12). As shown in FIG. 12, treating 5% w/v SAP with NaCl or NaOH reduced the viscosity (e.g., as indicated by a decrease in observed turbidity or by increased ability to stir with a stir bar) of aqueous SAP compositions. While 5% w/v SAP in deionized water remained a flocculant hydrogel, adding 0.1 M NaCl to 5% w/v SAP provided a more fluid and less flocculant hydrogel (FIG. 12). However, the SAP hydrogel in NaCl remained highly viscous. Adding 0.3 M to 3 M NaOH to 5% w/v SAP and incubating for 5 to 24 hours produced substantially less viscous aqueous SAP compositions (FIG. 12).

Further, aqueous compositions of SAP were treated with NaCl or NaOH to provide a composition for sonication to produce soluble PAA fragments. During the development of embodiments of the technology provided herein, experiments were conducted and data were collected indicating that adding a salt (e.g., NaCl) to SAP hydrogels and/or decrosslinking the SAP hydrogel (e.g., by adding a base (e.g., NaOH)) decreases the absorbent capacity of SAP, thus also decreasing the viscosity of SAP hydrogels and providing an SAP hydrogel comprising water (e.g., unabsorbed water) available for cavitation by sonication.

Data collected indicated that sonicating a 5.0% w/v SAP hydrogel comprising 0.1 M NaCl produced less than 50% soluble fragments. In particular, a 5.0% w/v hydrogel was prepared by adding 2.5 g of PAA (e.g., $PAA_{SPP}$ or $PAA_{P\&G}$) to 50 mL of 0.1 M aqueous NaCl in a jacketed beaker equipped with a stir bar. The aqueous hydrogel was sonicated for 5 minutes. The temperature was observed to increase to 45-50° C. during irradiation. Aliquots were collected for SEC analysis and recovery was determined by $^1$H NMR. Data indicated that: 1) sonication of SAP in deionized water (e.g., salt-free water) at SAP concentrations of greater than 1% w/v produced no degraded fragments; 2) sonication of 5% w/v SAP in 0.1 M NaCl produced less than 50% soluble PAA fragments; and 3) sonication of 5% w/v SAP after decrosslinking with NaOH produced nearly quantitative (e.g., nearly 100% recovery) soluble PAA fragments.

Thus, these data surprisingly indicated that adding a salt (e.g., NaCl) to SAP hydrogels increases the recovery of soluble PAA fragments by sonication. However, the recovery of soluble PAA fragments from aqueous SAP hydrogels comprising NaCl was less than 50%. More surprisingly, the data collected indicated that adding a base (e.g., NaOH) to de-crosslink SAP in aqueous SAP hydrogels increases the recovery of soluble PAA fragments by sonication to nearly 100% (e.g., nearly quantitative recovery of soluble PAA from aqueous SAP hydrogels).

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method for producing polyacrylic acid (PAA) from a superabsorbent polymer (SAP); wherein said SAP is further surface-crosslinked; said method comprising adding a base and NaCl to an aqueous SAP hydrogel, and sonicating said aqueous SAP hydrogel to produce said PAA;

wherein said aqueous SAP hydrogel comprises at least 2.5% weight per volume SAP.

2. The method of claim 1, wherein the base added to said aqueous SAP hydrogel is NaOH.

3. The method of claim 1 wherein said sonicating provides an ultrasonic frequency.

4. The method of claim 1 wherein said sonicating provides a frequency of 20 kHz.

5. The method of claim 1 wherein said method recovers at least 85% of said SAP as PAA.

6. The method of claim 1 wherein said PAA has a $M_w$ of approximately 50 to 2500 kg/mol.

7. The method of claim 1 wherein said PAA has a dispersity of approximately 1.0 to 10.0.

8. The method of claim 1 wherein the maximum specific energy of said sonicating is less than or equal to 50 MJ/kg SAP.

9. The method of claim 1 wherein said sonicating is performed for at least 1 to 25 minutes.

10. The method of claim 1 further comprising obtaining said SAP from a post-consumer source or a post-industrial source.

11. A method for producing polyacrylic acid (PAA) from a crosslinked superabsorbent polymer (SAP); the method comprising forming an aqueous SAP hydrogel comprising the crosslinked SAP, base and NaCl, and sonicating the aqueous SAP hydrogel to produce the PAA;

wherein the aqueous SAP hydrogel comprises at least 2.5% weight per volume SAP.

* * * * *